United States Patent
King et al.

(10) Patent No.: US 9,132,805 B1
(45) Date of Patent: Sep. 15, 2015

(54) UNATTENDED-VEHICLE ENGINE-IDLING SYSTEM

(71) Applicant: FORD GLOBAL TECHNOLOGIES, LLC, Dearborn, MI (US)

(72) Inventors: Daniel M. King, Northville, MI (US);
Thomas L. Miller, Ann Arbor, MI (US);
Kevin T. Hille, Plymouth, MI (US);
Scott A. Watkins, Canton, MI (US);
James E. Kaminske, Brownstown, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 32 days.

(21) Appl. No.: 14/263,351

(22) Filed: Apr. 28, 2014

(51) Int. Cl.
*B60R 25/04* (2013.01)
*B60R 25/23* (2013.01)
*B60R 25/06* (2006.01)
*B60R 25/21* (2013.01)
*B60R 25/10* (2013.01)

(52) U.S. Cl.
CPC ............... *B60R 25/04* (2013.01); *B60R 25/06* (2013.01); *B60R 25/1001* (2013.01); *B60R 25/21* (2013.01); *B60R 25/23* (2013.01); *B60R 2025/0415* (2013.01)

(58) Field of Classification Search
CPC ...... B60R 25/04; B60R 25/06; B60R 25/1001
USPC .................... 340/425.5, 426.1, 426.11, 426.3
See application file for complete search history.

(56) References Cited

U.S. PATENT DOCUMENTS

| 4,754,838 | A | 7/1988 | Cody |
| 5,670,831 | A | 9/1997 | Georgiades |
| 7,019,625 | B2 * | 3/2006 | Harada ................. 340/426.1 |
| 2006/0138863 | A1 * | 6/2006 | Jones et al. .............. 307/10.1 |
| 2013/0066525 | A1 * | 3/2013 | Tomik et al. ................ 701/45 |

FOREIGN PATENT DOCUMENTS

| DE | 10163227 A1 | 7/2003 |
| WO | 0061407 | 10/2000 |

* cited by examiner

*Primary Examiner* — Faye M Fleming
(74) *Attorney, Agent, or Firm* — Frank MacKenzie; MacMillan, Sobanski & Todd, LLC (57) ABSTRACT

An unattended-vehicle engine-idling system controls a vehicle powertrain in a non-motive mode with the engine running. An ignition switch operables with a removable ignition key. A control circuit has multiple states including a PREARMED state which is entered when the powertrain is in the motive mode and the user generates a manual activation signal. An ARMED state is entered when the transmission is in Park and holds an ignition switch status signal at RUN. An ACTIVE state is entered when the ignition switch is moved to the Accessory or Off positions or the key is removed. The powertrain is switched to non-motive mode and the switch status signal stays at RUN. A DISARMED state is entered in response to a manual deactivation signal generated independently of the ignition switch. In the DISARMED state, the ignition switch status signal corresponds with the ignition switch position, thereby turning off the engine.

23 Claims, 7 Drawing Sheets

UNATTENDED-VEHICLE ENGINE-IDLING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to engine idling of motor vehicles while unattended, and, more specifically, to a control system and method for entering an idling mode in a convenient and efficient fashion while maintaining vehicle security.

There are many circumstances in which a user of a vehicle may want to exit their running vehicle and leave it unattended while the engine continues idling. The reasons for doing so may vary depending on the type of user or class of vehicle. Vehicle purchasers typically fall into three categories, namely a retail customer (using the vehicle for typical everyday personal use), a commercial fleet customer (using the vehicle for a business use such as delivery or service), and an emergency/law enforcement customer (for police, ambulance, and fire purposes).

A primary reason for continuing to operate the vehicle engine is to maintain operation of other vehicle systems that depend on the engine. For example, a retail customer may want to leave the vehicle running while temporarily stepping away from the vehicle in order to maintain the cabin temperature, which requires continued operation of a heater or air conditioner. A service vehicle in a commercial fleet may be equipped with an elevated lift platform (e.g., cherry picker), and the user may want to leave the vehicle running to maintain power to the elevated lift platform while the platform is elevated. The user of a commercial vehicle being used to deliver merchandise that requires climate control (e.g., food) may need to leave the vehicle running unattended while making deliveries.

The emergency fleet customer has countless scenarios where they want to leave their vehicles running while unattended in order to maintain power to their auxiliary emergency equipment (e.g., electronic workstation, lights, video/audio equipment, communication equipment, etc.). For example, the user may leave their vehicle unattended during a traffic stop, crime scene investigation, or a foot pursuit.

A remote start function is known wherein a vehicle is started using a wireless remote control without requiring a key in the ignition switch. However, it would be inconvenient and disruptive for the user to obtain unattended idling when exiting the vehicle by a) shutting down the engine, b) removing the key, c) exiting and locking the vehicle, and then d) restarting the engine with a remote control. On the other hand, a vehicle left running unattended with the ignition key in the ignition switch may be at risk of being stolen.

One known solution has been utilize a separate key and wireless remote (i.e., FOB) allowing the user to lock/unlock the vehicle doors from outside leaving the key in the ignition with the engine running. However, a perpetrator could break into the vehicle by using a cloned remote device or breaking the window and then driving away. Using a spare mechanical key in a similar fashion is subject to the same problems.

Especially with regard to police vehicles, various aftermarket security system add-on devices are known that allow the user to leave the engine running and doors unlocked while preventing unauthorized use of the vehicle. In one type of key-based system, a dedicated button is added to the vehicle for use to activate the system. Once the system is activated and the vehicle is parked, the engine will remain running after the key is removed. The vehicle engine will shut down in response to various conditions, such as the vehicle being shifted out of Park. Otherwise, the vehicle will resume normal operation once the key cylinder is switched to the Run position with the key inserted. Such a system, however, may circumvent existing factory-installed security measures such as a passive anti-theft system (PATS) using a short-range transponder in the key which is electronically read by the vehicle during normal engine starting. Since the engine is already started, the PATS would not prevent theft of the running vehicle by an intruder.

Another type of system requires the ignition key to be left in the ignition switch at the Run position but prevents the transmission shifter from being moved out of Park unless the driver to activates a hidden switch to unlock the gearshift locking mechanism. These two events have to happen within a certain window of time, otherwise the locking mechanism will re-activate. The level of protection provided by this system is low because anyone who knows where and how the switch works will have full access to the vehicle, its contents, and operations since the key is present.

SUMMARY OF THE INVENTION

The present invention provides a system and method to integrate an ignition security system into a vehicle's electrical and electronic system that will secure an unattended vehicle with its engine idling while providing enhanced security and ease of use.

In one aspect of the invention, an unattended-vehicle engine-idling system is provided. A powertrain includes an engine and a transmission having a motive mode and a non-motive mode with the engine running and having an engine off mode. A control circuit is coupled to the engine and the transmission (e.g., the shift lever). An ignition switch is coupled to the control circuit and configured to be operable by a user with a removable ignition key to move to Off, Accessory, Run, and Start positions. The control circuit provides multiple states. A PREARMED state is entered when the powertrain is in the motive mode and the user generates a manual activation signal. An ARMED state is entered from the PREARMED state when the transmission is in a Park position. The ARMED state holds an ignition switch status signal at RUN. An ACTIVE state is entered from the ARMED state when the ignition switch is moved to the Accessory or Off positions or the key is removed from the ignition switch. The ACTIVE state switches the powertrain to the non-motive mode and holds the ignition switch status signal at RUN. A DISARMED state is entered from the ACTIVE state in response to a manual deactivation signal independent of the ignition switch. After entering the DISARMED state in that manner, the ignition switch status signal corresponds with the position of the ignition switch, thereby placing the powertrain in the engine off mode.

While in the ACTIVE state, the transmission shift lever is preferably prevented from moving out of the Park position. In addition, the state of the transmission can be monitored so that the engine can be shut down if a position other than Park is detected.

DETAILED DESCRIPTION OF PREFERRED EMBODIMENTS

The invention is illustrated in connection with an embodiment particularly adapted for use in law enforcement vehicles, referred to herein as Police Idle. This example demonstrates integration with a common vehicle architecture which includes a Body Control Module (BCM) that processes system inputs and outputs, manages system status, and executes various actions. A primary input which activates/deactivates the Police Idle function can be provided by a dedicated momentary push button switch (Police Idle switch) or by using the Start position of the ignition switch as described below. Other standard vehicle components that can be integrated with the Police Idle function include the Brake Transmission Shift Interlock (BTSI) which prevents the gear selector from shifting out of Park, the trunk release switch in the vehicle interior that allows the user to open the trunk without a key or FOB, the power window relay, and the vehicle multiplex network (e.g., CAN) to control various other accessories and for sending and receiving system messages. The invention may further integrate an Instrument Panel Cluster (IPC) that monitors a Park detect switch and displays system status on a message center, a Powertrain Control Module (PCM) which is enabled with a Drive Away Security Enhancement (DASE) feature configured to place the powertrain in a motive (normal) or non-motive (e.g., remote start) mode, and a Smart Data Link Connector (SDLC) that serves as a network gateway between modules, diagnostic tools and equipment.

Figure 1:
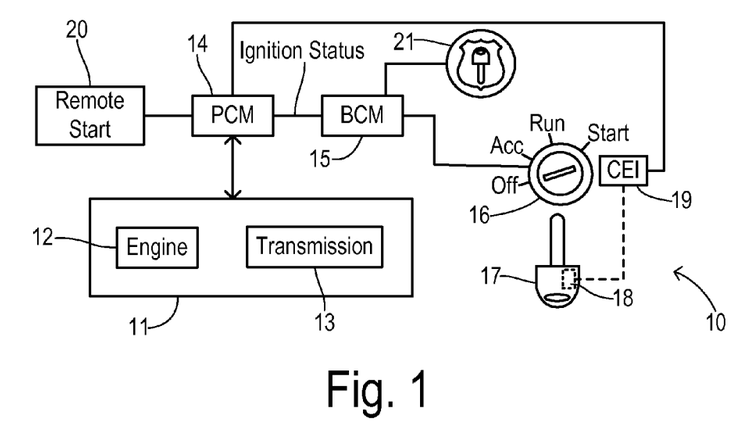
FIG. 1 is a schematic, block diagram showing vehicle systems and elements involved in various embodiments of the invention.

Referring now to FIG. 1, a vehicle apparatus 10 includes a powertrain 11 having an internal combustion engine 12 and a transmission 13. A powertrain control module (PCM) 14 coordinates operation of engine 12 and transmission 13 as known in the art. A body control module (BCM) 15 is connected to an ignition cylinder switch 16 for receiving a signal identifying a physical position of ignition switch 16 including an Off, Accessory, Run, or Start position. BCM 15 provides an ignition status signal to PCM 14 for use in controlling engine 12. As explained below, BCM 15 can be used to mask an actual position of ignition switch 16 by reporting a different ignition status signal to PCM 14 (e.g., holding the ignition status signal to Run when switch 16 is actually in the Accessory or Off position).

An ignition key 17 is configured to mechanically operate ignition switch 16. For enhanced security, a transponder 18 may be embedded in key 17 for interacting with an engine immobilizer transceiver 19 as known in the art. If an electronic code stored in transponder 18 matches a code stored in module 19, then an authorization signal may be provided to PCM 14 (which would not otherwise allow the engine to run).

For starting engine 12 remotely without inserting a key 17, a remote start module 20 may be provided as known in the art. When receiving a validated command from a wireless transmitter or FOB (not shown), module 20 sends an activation signal to PCM 14 for starting engine 12. With the known remote start feature, unattended idling of the engine is achieved while the vehicle remains secure. However, the conventional remote start function cannot be initiated by a driver while in the vehicle or while exiting the vehicle without requiring the engine to first be shut down and the doors to be locked.

For some embodiments of the Police Idle function of the present invention, an unattended engine-idle state can be initiated using a dedicated push-button switch 21 which is connected with BCM 15 in order to generate manual activation and/or deactivation signals. In one particularly advantageous embodiment, ignition switch 16 can be used to generate the manual activation signal by moving it into the Start position while the engine is already running. For a law enforcement officer in particular, this can provide a method for setting the Police Idle function that is very fast, intuitive, and done without diverting attention away from the surroundings.

Figure 2:
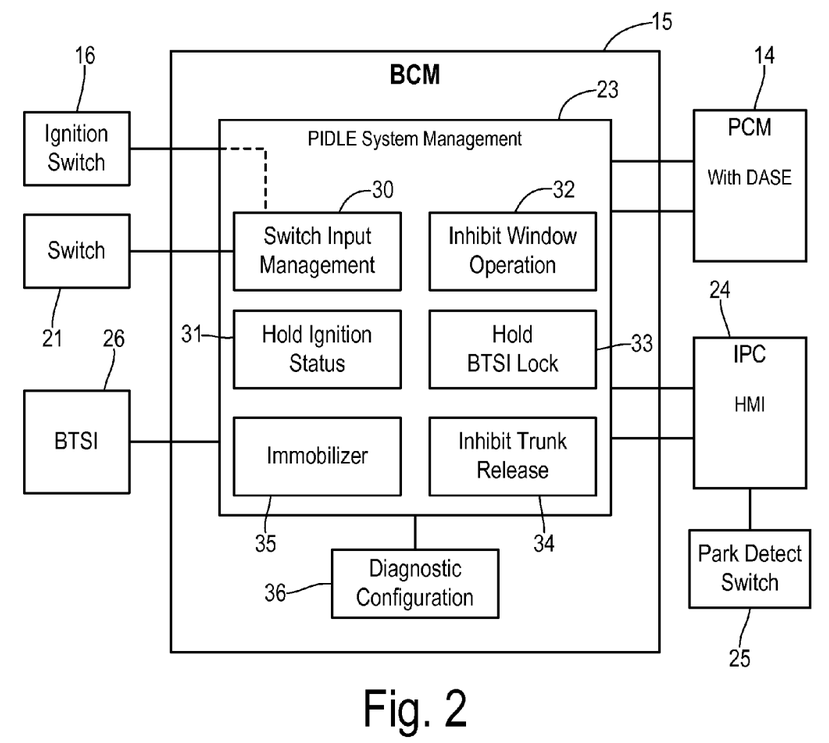
FIG. 2 is a block diagram showing one preferred embodiment for an electronic implementation of the invention.

As shown in FIG. 2, BCM 15 functions as a control circuit including Police Idle system management block 23. The control circuit may include a microcontroller with appropriate firmware and/or software, for example. An instrument panel cluster (IPC) 24 is comprised of a separate module which is coupled with BCM 15 for monitoring a park position detection switch 25 and for displaying system status messages on a message center forming part of a human machine interface (HMI).

A brake transmission shift interlock (BTSI) unit 26 is coupled to BCM 15 and functions in a known manner (i.e., the gear shift selector is locked by a solenoid in the park position unless the ignition switch is in the Run position and the brake pedal is depressed).

Police Idle management system 23 includes a switch input management block 30 which is responsive to ignition switch 16 and/or dedicated switch 21 to generate the manual activation and deactivation signals. A hold ignition status block 31 is used to modify the ignition status signal as described below. An inhibit window operation block 32 may prevent the lowering of vehicle windows while the Police Idle function is active, and a hold BTSI block 33 may ensure that the gear shift lock solenoid continuously locks the gear shift lever in the park position while the Police Idle function is active. An inhibit trunk release block 34 is provided for ensuring that a manual trunk release switch contained in the vehicle interior cannot be utilized while the Police Idle function is active. Police Idle management system 23 further includes an immobilizer block 35 that initiates an interrogation of a key transponder during an attempted restoration of the vehicle to normal operation upon return of the user.

A diagnostic configuration block 36 is provided for enabling the vehicle manufacturer or a service technician to alter the configuration of BCM 15 by selectably enabling or disabling the Police Idle function.

Figure 3:
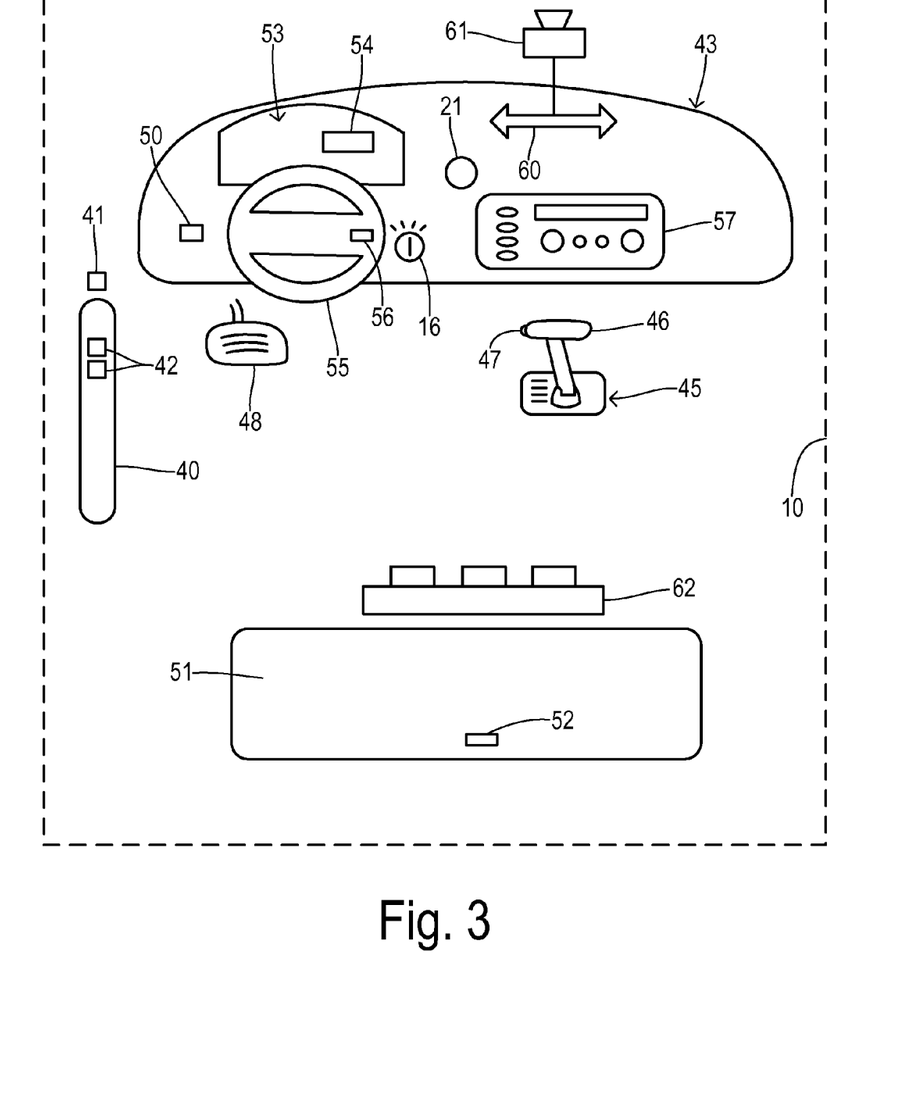
FIG. 3 is a schematic diagram showing parts of a vehicle involved in various embodiments.

FIG. 3 shows a layout of the various interacting components within vehicle 10 as utilized by the present invention. Thus, vehicle 10 has a driver door 40 having open and closed positions which are sensed by a door position sensor 41. Power window control buttons 42 may be provided on door 40 for manually controlling the raising or lowering of the vehicle windows.

An instrument panel (i.e., dashboard) 43 has various controls accessible to the user including dedicated switch 21. A gear selector unit 45 includes a shift lever 46 with a lock/unlock button 47 for selecting a transmission setting including a Park position and conventional out-of-park positions. A brake pedal 48 has an associated brake sensor (not shown) which interacts with ignition switch 16 and gear selector 45 to provide the conventional BTSI function.

Instrument panel 43 includes a trunk release button 50 for opening a trunk lid 51 via a electronically controlled latch 52. Instrument panel 43 further provides a cluster area 53 for providing a message center 54. Other multipurpose switches may be deployed within the vehicle (e.g., on instrument panel 43) for interacting with the present invention, including a multipurpose selector switch 56 on steering wheel 55 or various push buttons on a multimedia/climate control panel 57. User commands entered via these push buttons or via other switches (e.g., a brake pedal switch) can be relayed to the Police Idle system manager to obtain desired functions, such as the shutting down of the engine without using the ignition key as described below.

The Police Idle system manager can be implemented in any one or more of the various electronic modules that may be present in any particular vehicle model, which may or may not include a body control module. Such modules and various sensors and actuators may typically communicate over a multiplex bus 60, thereby allowing the Police Idle system manager to interact with a wide range of vehicle systems. For example, the Police Idle control circuit may interact over bus 60 with a vehicle security system including an alarm generator 61 (e.g., a vehicle horn and/or exterior lights that can be triggered for generating an audible and visible alarm). Other auxiliary accessories that should be locked or inhibited during Police Idle activation may be connected either directly or via multiplex bus 60 such as a remotely-controlled gun rack 62. During Police Idle activation with the vehicle unattended, a status message sent to gun rack 62 would cause automatic locking so that a stored gun could not be accessed while a police officer was away from the vehicle, for example.

Figure 4:
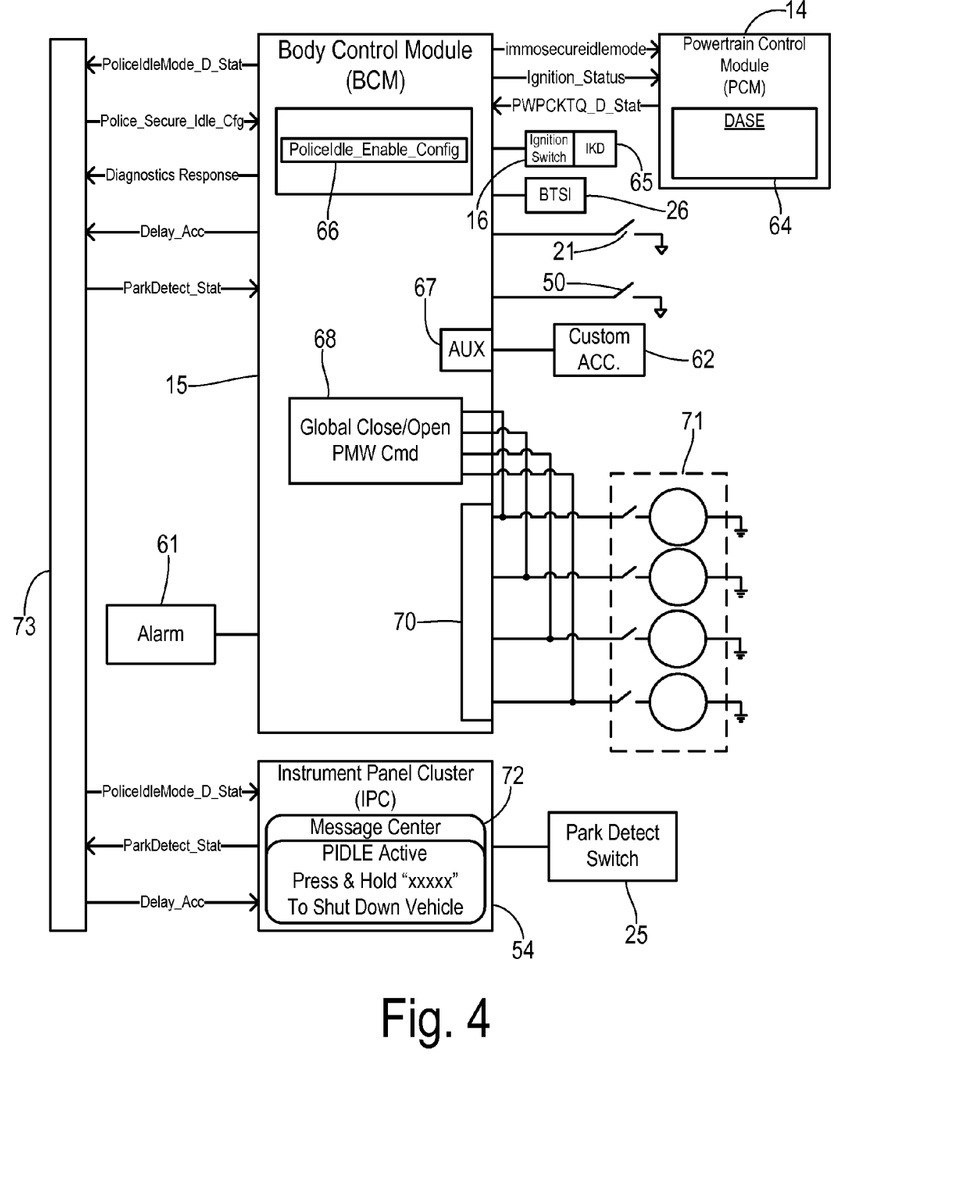
FIG. 4 is a block diagram showing a preferred embodiment in greater detail.

FIG. 4 shows various signals that may be communicated during operation of the invention. An Ignition_Status signal provided from BCM 15 to PCM 14 normally identifies the physical position of ignition switch 16 (together with an identification whether the ignition key is present, obtained from an in-key detector (IKD) sensor 65). In addition, a control signal is provided to PCM 14 to indicate whether the Police Idle function is active so that a drive-away security enhancement (DASE) 64 feature of PCM 14 may be appropriately activated to ensure that the vehicle cannot be driven as long as Police Idle remains active (e.g., by cutting the engine if the transmission leaves the Park position). PCM 14 provides an engine status signal to BCM 15 indicative of whether the engine is running or has stalled.

BCEM 15 includes a configurable memory location 66 which is set by the manufacturer or a service technician in order to either enable or disable the police idle function depending on whether the vehicle is actually used by a law enforcement organization, for example. For the purpose of setting the contents of memory 66, a diagnostic tool may be connected via smart data link connector (SDLC) 73 to perform a programming sequence including the writing of police secure idle configuration data (PoliceIdle_Enable_Cfg). A diagnostic response signal may be provided to the diagnostic tool via SDLC 73 to confirm a programming action.

As shown in FIG. 4, BCM 15 may communicate with IPC 54 via SDLC 73. Data/text to be displayed on a message center 72 is sent or identified by a police idle mode status signal (PoliceIdleMode_D_Stat) from BCM 15 to IPC 54. As shown in FIG. 4, a message may be displayed on message center 72 explaining what action is necessary during a Police Idle activation in order to cancel the Police Idle function (i.e., shut down the engine idle). A Delay_Acc signal is controlled by BCM 15 in order to inhibit power window operation when Police Idle is Active.

As also shown in FIG. 4, a custom accessory 62 (such as a gun rack) can be directly connected to an auxiliary control output 67 instead of by a multiplex message.

FIG. 4 also shows a conventional delay accessory relay 70 for powering a plurality of window switches and motors 71. A global close/open power window command block 68 in BCM 15 is configured to inhibit any opening commands while the Police Idle function is active in order to enhance the security of any vehicle contents while the vehicle is unattended.

Figure 5:
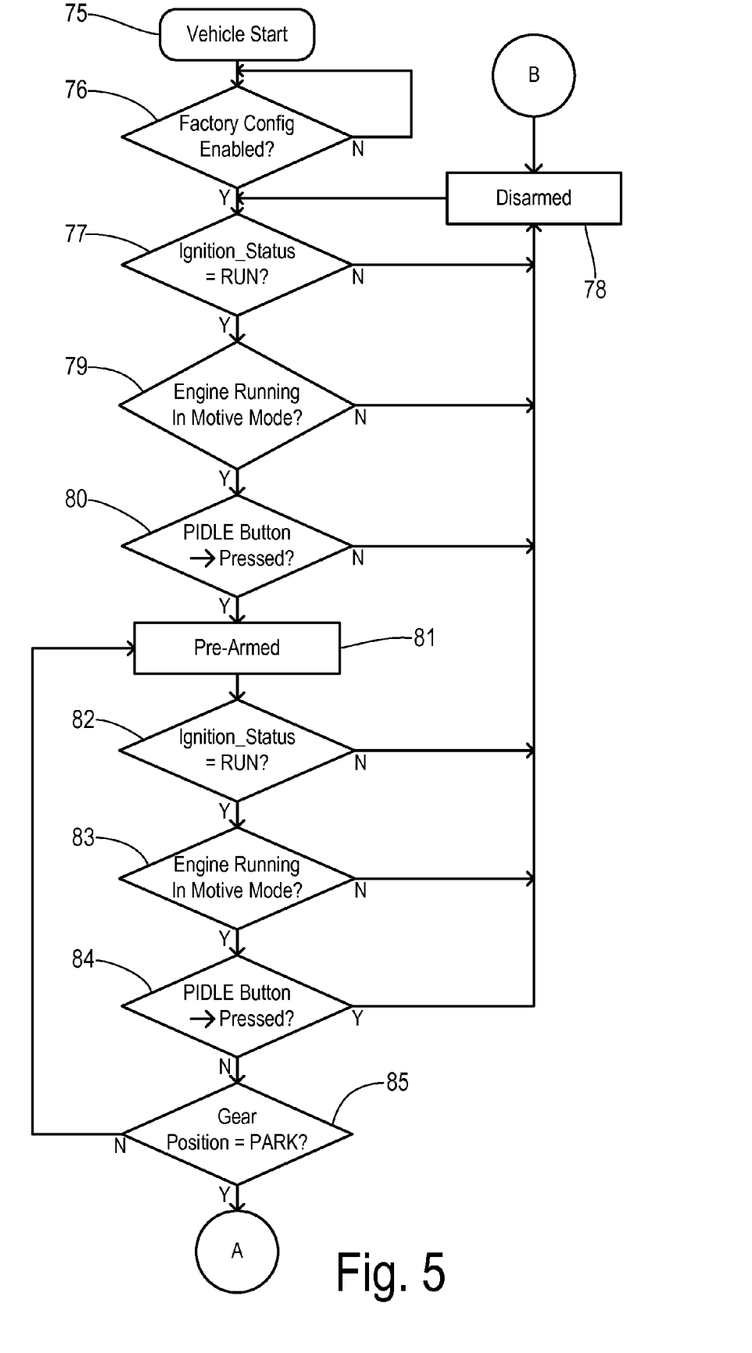
FIGS. 5 and 6 are a flowchart showing one preferred method of the invention.

A preferred method of the invention will be described in connection with the flowchart of FIGS. 5 and 6. The method begins when the vehicle is started in step 75. In step 76, a configuration bit in the BCM is checked. This configuration bit may be enabled at the factory per a customer order code, for example. A service tool can be used to disable the configuration if desired (e.g., decommissing a police vehicle for re-sale). If not configured for Police Idle operation, the method does not progress beyond step 76. If the configuration is enabled, a check is performed to determine whether the vehicle operator put the ignition switch in RUN in step 77 and whether the engine is running in motive mode in step 79 (wherein motive mode means that torque is available to operate the vehicle, whereas non-motive mode means that the engine is running but torque is not available to operate the vehicle). If either of these conditions is not satisfied, then the Police Idle function remains in a DISARMED state 78.

Once it is confirmed that the vehicle is running in motive mode, a check is performed in step 80 to determine whether a manual Police Idle activation signal is generated. Thus, the Police Idle control circuit will wait in DISARMED state 78 until the vehicle operator initiates a "button press" which puts the control circuit into a PREARMED state 81. As previously mentioned, the invention may use two alternative methods for the user to initiate a "button press." The first method uses a dedicated momentary push button, and the second method uses the ignition switch (i.e., key cylinder). The ignition switch has four unique positions (Off, Accessory (ACC), Run, or Start). To start the vehicle, the user inserts the key into the ignition switch and rotates it from Off to Start to Run. After the vehicle is running, the Start position of the ignition switch is used to activate the Police Idle system. Thus, the vehicle operator can PREARM the Police Idle function by rotating the key from Run to Start. The integrated ignition switch is a simple solution that avoids the cost and space required to package a dedicated switch. It also allows a police officer to quickly activate the Police Idle function and remove the key with a one-handed operation, which can be important during an emergency situation.

While in PREARMED state 81, the IPC is preferably illuminated with a telltale (e.g., a yellow indicator lamp) on the message center to alert the vehicle operator that the system is PREARMED. The Police Idle control circuit will transition to an ARMED state 86 once a gear shift position of Park is detected in a step 85, unless any of the conditions monitored in steps 82-84 are detected first. Thus, a check is performed in step 82 to determine whether the user disables the engine by moving the ignition key out of Run position before placing the gear selector in Park position. In addition, a check is performed in step 83 to determined whether the engine has not stalled. If the engine is not running in either instance, then the control circuit transitions back to DISARMED state 78. Furthermore, a check is performed in step 84 to determine whether the user has performed another manual trigger of the Police Idle button which is interpreted as a deactivation signal (i.e., by returning to DISARMED state 78).

Figure 6:
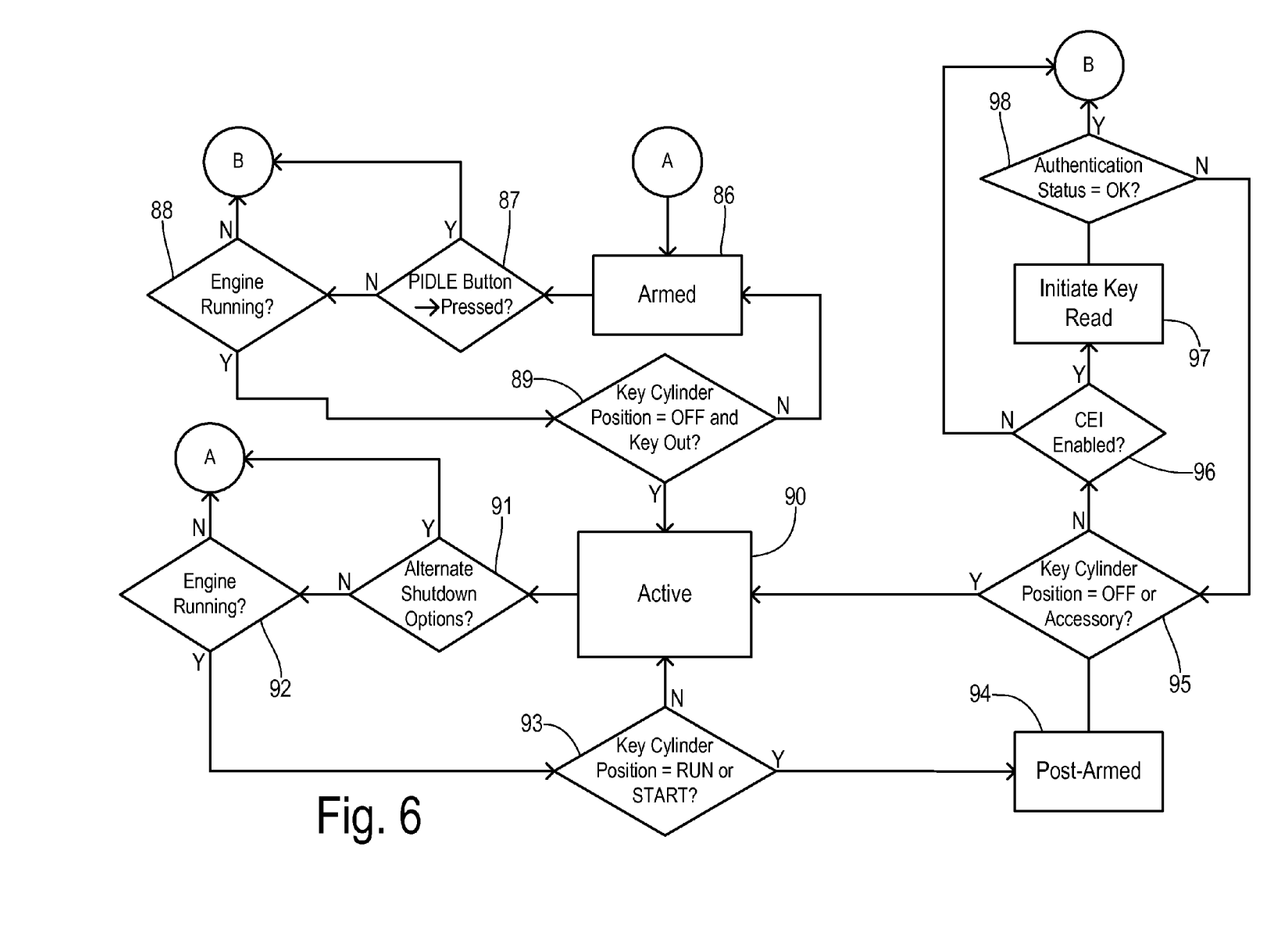

When the Park position is detected in step 85, then the method proceeds via point A to ARMED state 86 in FIG. 6. In ARMED state 86, the telltale on the IPC will continue to illuminate (e.g., a yellow indicator lamp) and the BCM control circuit will hold the Ignition_Status signal at a value indicating the Run position. As already mentioned, the Ignition_Status signal is comprised of a message sent via the CAN bus that normally represents the physical position of the ignition switch. By altering the message to have a value of "Run" in order to mask the signal, the engine remains running and other vehicle subsystems will remain operational when the user switches the ignition switch to Off (so that the climate control and electrical accessories other than those associated with the motive mode of the vehicle can continue to function normally).

Once the BCM control circuit is in ARMED state 86, it will either transition to an ACTIVE state 90 or back to DISARMED state 78 via point B. Transitioning back to DISARMED state 78 occurs if the user initiates another "button press" (i.e., cancels the system) in step 87 or if a vehicle stall is detected in step 88. Otherwise, the system will activate (i.e., go to ACTIVE state 90) when the user switches the ignition switch to Off or Accessory in step 89. As a result of entering ACTIVE state 90, the telltale on the IPC will change colors (e.g., green) to indicate that the system is active and the system will activate security measures to allow the vehicle operator to leave the vehicle unattended yet secure. Such actions preferably include:

- Holding the BTSI in the locked position to prevent the vehicle gear selector from shifting out of PARK.
- Inhibiting the power windows from operating.
- Placing the PCM in non-motive (DASE) mode. This is an added layer of security in the event that the BTSI lock is defeated. When in the non-motive mode, the PCM will shut down the engine if the gear selector is shifted out of PARK or if vehicle speed is detected.
- Disabling the trunk release button in the cabin of the vehicle to prevent unauthorized access to any contents stowed away in the trunk (e.g., weapons, evidence, uniforms, etc. . . . ). The key cylinder and remote FOB would still have access to the trunk.
- Transmitting a CAN message for use by customized auxiliary security equipment (e.g., lock for a gun rack).
- If enabled by the user, sounding an alarm if someone enters the vehicle without the key (described in more detail below in connection with FIG. 8).

Upon returning to the vehicle with the Police Idle control circuit in ACTIVE state 90, the user will need the key to resume normal vehicle operation. If either the key or user is not available (for example, a lost key or an injured officer), an alternative method may be needed to shut down the vehicle. Specific shutdown actions can be detected in step 91. For example, if the vehicle is equipped with a dedicated Police Idle switch, then a button press generates a manual deactivation signal which is detected in step 91 and causes the control circuit to return to DISARMED state 78 via point B so that the engine shuts down. Alternatively, the message center can display instructions for shutting down the vehicle using other means such as multifunction switches on the steering wheel or instrument panel or a brake pedal switch. Example instructions include:

- "PRESS & HOLD BRAKE PEDAL TO SHUT DOWN VEHICLE"
- "DOUBLE TAP THE BRAKE PEDAL TO SHUT DOWN VEHICLE"
- "PULL & HOLD GEAR SHIFT LEVER TO SHUT DOWN VEHICLE"
- "PRESS & HOLD OK TO SHUT DOWN VEHICLE"

Note that sequences such as the "press & hold" and the "double tap" steps alleviate inadvertent shut down during ingress or egress by a user. In addition to the alternate shutdown options, the method continues to check for an engine stall in step 92 and returns to DISARMED state 78 in the event of a stall.

Assuming the key is available, then the user can resume normal vehicle operation by using the key to switch the ignition back into the Run or Start position in step 93. The BCM control circuit then transitions to a POST-ARMED state 94. The purpose of POST-ARMED state 94 that if the vehicle is equipped with an engine immobilizer system (i.e., passive anti-theft system), then the immobilizer authentication process will initiate and validate the key before disarming the Police Idle function. Thus, a check is performed in step 96 to determine whether the vehicle has an enabled immobilizer system. If not, then a transition is made to DISARMED state 78 via point B and the vehicle operates normally in response to the key operating the ignition switch. If the immobilizer is enabled, then a key read is initiated in step 97 and authentication of the key is checked in step 98. If valid, then a transition is made to DISARMED state 78 via point B and the vehicle operates normally. If not valid, then a check is performed in step 95 to determine if the ignition returns to Off or Acc positions. If so, then a return is made to the main loop for ACTIVE state 90. Otherwise, the immobilizer continues to check for a valid key.

Figure 7:
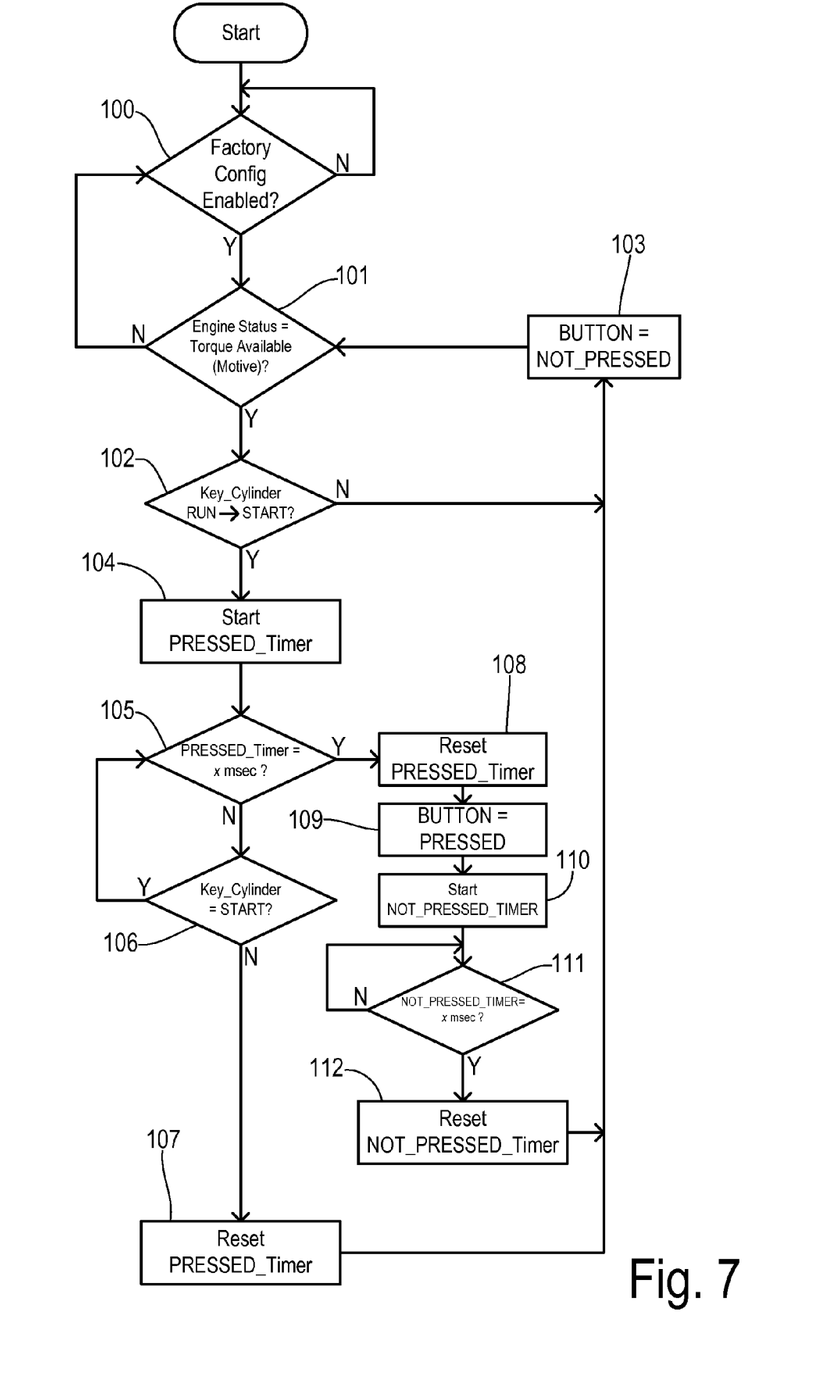
FIG. 7 is a flowchart showing a method for using an ignition switch to generate a manual activation signal for the invention.

FIG. 7 discloses a method for filtering a signal generated by the ignition switch in response to the Start position of the ignition switch so that a manual activation of the Police Idle function can be reliably detected. A check is performed in step 100 to determine whether the factory configuration has been enabled for performing the Police Idle function. If so, then an engine status is checked in step 101 to determine whether the powertrain is in the motive mode. If not, then a return is made to step 100. Otherwise, a check is performed in step 102 to determine whether a transition has been made in the ignition switch position from the Run to the Start position. If not, then a value for a Button signal maintained by the control circuit is set to "NOT_PRESSED" in step 103. When ignition switch movement from Run to Start is detected in step 102, then a PRESSED_Timer is started in step 104.

Next, a check is performed in step 105 to determine whether a continuously incrementing value of PRESSED_Timer reaches a predetermined time of x milliseconds (e.g., about 500 mS). If not, then a check is performed in step 106 to determine whether the ignition switch position has stayed at the Start position. Thus, steps 105 and 106 work together to ensure that the ignition switch position is continuously detected at Start for the predetermined time, so that any shorter, inadvertent movement is ignored. Thus, if the Start position is not detected in step 106, then the PRESSED_Timer is reset in step 107.

When step 105 detects that the key position has remained at the Start position for the predetermined amount of time, then the PRESSED_Timer is reset in step 108 and the value of the Button signal is set to "PRESSED" in step 109. Next, a predetermined duration for maintaining the "PRESSED" value for the Button signal is synthesized by starting a NOT_PRESSED_Timer in step 110, and waiting until the NOT_PRESSED_Timer reaches a predetermined time (e.g., x milliseconds) in step 111 before resetting the NOT_PRESSED_Timer in step 112 and updating the value of the Button signal to NOT_PRESSED in step 103. Preferably, a check may also be performed to confirm that the ignition switch is not still in the Start position before moving to step 103.

Figure 8:
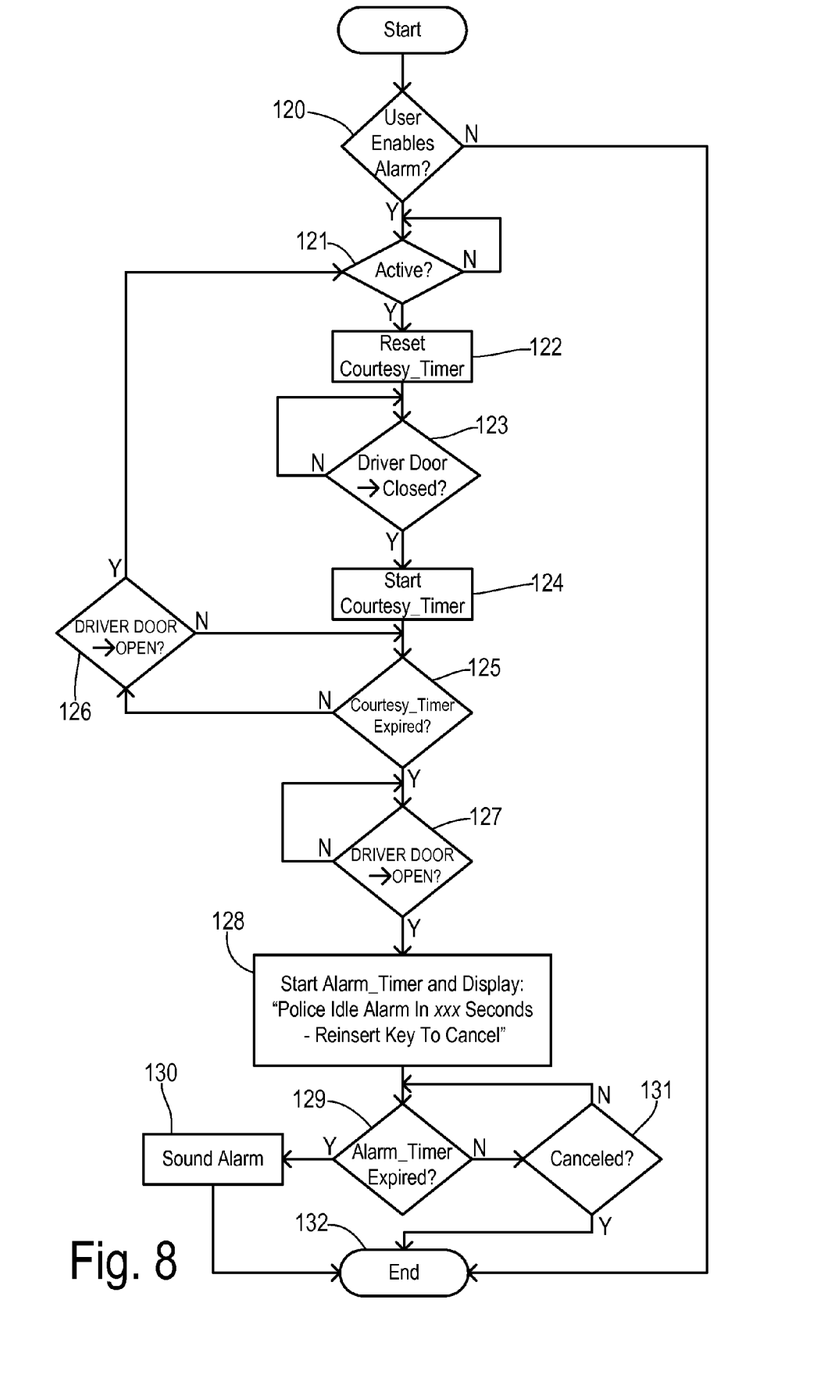
FIG. 8 is a flowchart showing a method for operating an alarm when an unattended idle is in progress.

FIG. 8 illustrates one preferred method for generating an alarm signal in the event that an intruder enters the vehicle during the Police Idle function without using the ignition key to cancel the Police Idle function. Thus, a check is performed in step 120 to determine whether the user has enabled the alarm function. If not, then the method ends at step 132. If enabled, then a check is performed in step 121 to determine whether the ACTIVE state of Police Idle has been entered. Once in the ACTIVE state, a courtesy timer is reset in step 122 to allow the user a predetermined time to re-enter the vehicle after closing the door in case the situation changes and they do not want to perform the Alarm function. Thus, a check is performed in step 123 to detect closing of the door, and in response to closing of the door the courtesy timer is started in step 124. A check is performed in step 125 to determine whether the courtesy timer has expired. If not, then a check is performed in step 126 to determine whether the driver door has been reopened. If not, then another check is made for expiration of the timer in step 125. If the door is detected as open in step 126, then a return is made to step 121 since it will be assumed that the user changed their mind about leaving the vehicle unattended just yet.

Upon expiration of the courtesy timer in step 125, it is assumed that the driver did leave the area. Thus, the method waits until a opening of the driver door is detected in step 127. Once the driver door opens, an alarm timer is started and the message center displays a warning message directing the user to reinsert the ignition key to cancel the alarm within a predetermined number of seconds. A check is performed in step 129 to determine whether the alarm timer has expired. If it has, then the alarm is sounded in step 130. If it has not yet expired, then a check is performed in step 131 to determine whether the user has reinserted the key and canceled the alarm. If so, then the procedure ends at step 132. Otherwise, it returns made to step 129 to re-check for expiration of the alarm timer. Once the alarm is sounded in step 130, the controller continues to check for reinsertion of the key so that the alarm can be terminated.

What is claimed is:

1. An unattended-vehicle engine-idling system, comprising:
    a powertrain including an engine and a transmission having a motive mode and a non-motive mode with the engine running and having an engine off mode;
    a control circuit coupled to the engine and the transmission; and
    an ignition switch coupled to the control circuit and configured to be operable by a user with a removable ignition key to move to Off, Accessory, Run, and Start positions;
    wherein the control circuit provides:
        a PREARMED state entered when the powertrain is in the motive mode and the user generates a manual activation signal;
        an ARMED state entered from the PREARMED state when the transmission is in a Park position, wherein the ARMED state holds an ignition switch status signal at RUN;
        an ACTIVE state entered from the ARMED state when the ignition switch is moved to the Accessory or Off positions or the key is removed from the ignition switch, wherein the ACTIVE state switches the powertrain to the non-motive mode and holds the ignition switch status signal at RUN; and
        a DISARMED state entered from the ACTIVE state in response to a manual deactivation signal independent of the ignition switch, wherein in the DISARMED state the ignition switch status signal corresponds with the position of the ignition switch, thereby placing the powertrain in the engine off mode.

2. The system of claim 1 wherein the ACTIVE state is entered immediately upon the ignition switch moving to the Accessory or Off positions.

3. The system of claim 1 wherein the manual activation signal is comprised of moving the ignition switch to the Start position.

4. The system of claim 1 wherein the manual activation signal is comprised of actuating a dedicated push button.

5. The system of claim 1 wherein the manual deactivation signal is comprised of actuating a push button coupled to the control circuit.

6. The system of claim 1 wherein the manual deactivation signal is comprised of actuating a brake pedal according to a predetermined sequence.

7. The system of claim 1 wherein the control circuit further provides:
    a POST-ARMED state entered from the ACTIVE state in response to movement of the ignition switch out of the Off position, wherein the POST-ARMED state includes checking for validity of an ignition key, wherein if the ignition key is not checked as valid and is removed then the control circuit enters the ACTIVE state and otherwise enters the DISARMED state.

8. The system of claim 1 wherein the ACTIVE state is further comprised of locking a shifter so that the transmission remains in the Park position, disabling a power window function, and disabling a push-button trunk release function.

9. The system of claim 1 further comprising a multiplex bus coupling the control circuit to an accessory control module, wherein the ACTIVE state is further comprised of sending a command to the accessory module for inhibiting an accessory feature.

10. The system of claim 1 further comprising a door position sensor and an audible alarm generator, wherein the ACTIVE state is further comprised of triggering the audible alarm generator if the ACTIVE state continues for a predetermined time period after the door position sensor detects opening of a door.

11. The system of claim 1 further comprising a display panel for displaying respective messages corresponding to a current state of the control circuit.

12. The system of claim 11 wherein a message displayed in the ACTIVE state is descriptive of an action to generate the manual deactivation signal.

13. Apparatus comprising:
    a powertrain having motive and non-motive modes;
    a control circuit coupled to the powertrain;
    an ignition switch operable to Off, Run, and Start positions;
    wherein the control circuit enters an ARMED state if the ignition switch moves to Start while in the motive mode and the transmission is in a Park position, and switching to non-motive mode if the key moves to Off while in the ARMED state.

14. A method for engine-idling of an unattended-vehicle, wherein the vehicle includes a powertrain with an engine and a transmission having a motive mode and a non-motive mode with the engine running and having an engine off mode, wherein the vehicle includes a control circuit coupled to the engine and the transmission, and wherein the vehicle includes an ignition switch coupled to the control circuit and configured to be operable by a user with a removable ignition key to move to Off, Accessory, Run, and Start positions, the method comprising the steps of:

entering a PREARMED state when the powertrain is in the motive mode and the user generates a manual activation signal;

entering an ARMED state from the PREARMED state when the transmission is in a Park position, wherein the ARMED state holds an ignition switch status signal at RUN;

entering an ACTIVE state from the ARMED state when the ignition switch is moved to the Accessory or Off positions or the ignition key is removed from the ignition switch, wherein the ACTIVE state switches the powertrain to the non-motive mode and holds the ignition switch status signal at RUN; and     entering a DISARMED state from the ACTIVE state in response to a manual deactivation signal independent of the ignition switch, wherein in the DISARMED state the ignition switch status signal corresponds with the position of the ignition switch, thereby placing the powertrain in the engine off mode.

15. The method of claim 14 wherein the manual activation signal is comprised of moving the ignition switch to the Start position.

16. The method of claim 14 wherein the manual activation signal is comprised of actuating a dedicated push button.

17. The method of claim 14 wherein the manual deactivation signal is comprised of actuating a push button coupled to the control circuit.

18. The method of claim 14 wherein the manual deactivation signal is comprised of actuating a brake pedal according to a predetermined sequence.

19. The method of claim 14 further comprising the step of:

entering a POST-ARMED state from the ACTIVE state in response to movement of the ignition switch out of the Off position, wherein the POST-ARMED state includes checking for validity of an ignition key, wherein if the ignition key is not checked as valid and is removed then the control circuit enters the ACTIVE state and otherwise enters the DISARMED state.

20. The method of claim 14 wherein the ACTIVE state is further comprised of locking a shifter so that the transmission remains in the Park position, disabling a power window function, and disabling a push-button trunk release function.

21. The method of claim 14 wherein the ACTIVE state is further comprised of sensing a door position and triggering an audible alarm generator if the ACTIVE state continues for a predetermined time period after detecting an opening of a door.

22. The method of claim 14 the ACTIVE state is further comprised of displaying a message that is descriptive of an action to generate the manual deactivation signal.

23. The method of claim 14 wherein the ACTIVE state is entered immediately upon the ignition switch moving to the Accessory or Off positions.

\* \* \* \* \*